US007188771B2

(12) United States Patent
Poulter

(10) Patent No.: US 7,188,771 B2
(45) Date of Patent: Mar. 13, 2007

(54) FLUID DELIVERY APPARATUS

(75) Inventor: Trevor Poulter, West Yorkshire (GB)

(73) Assignee: Gardner Denver International, Ltd., Bradford (GB)

( * ) Notice: Subject to any disclaimer, the term of this patent is extended or adjusted under 35 U.S.C. 154(b) by 0 days.

(21) Appl. No.: 10/510,666

(22) PCT Filed: Apr. 2, 2003

(86) PCT No.: PCT/GB03/01452

§ 371 (c)(1),
(2), (4) Date: Aug. 29, 2005

(87) PCT Pub. No.: WO03/086952

PCT Pub. Date: Oct. 23, 2003

(65) Prior Publication Data

US 2006/0006228 A1 Jan. 12, 2006

(30) Foreign Application Priority Data

Apr. 9, 2002 (GB) ................................ 0208099.2

(51) Int. Cl.
*G06K 7/10* (2006.01)

(52) U.S. Cl. .................. 235/462.45; 235/375; 235/381

(58) Field of Classification Search ................ 235/375, 235/380, 381, 462.01; 702/12, 45; 141/94, 141/96, 351–362; 222/1, 3, 4, 109
See application file for complete search history.

(56) References Cited

U.S. PATENT DOCUMENTS 3,580,420 A * 5/1971 Kennedy et al. ............... 222/1
4,345,146 A 8/1982 Story et al.
4,469,149 A * 9/1984 Walkey et al. ................ 141/94
4,553,573 A * 11/1985 McGarrah .................... 141/98
5,722,469 A * 3/1998 Tuminaro .................... 141/94
5,913,180 A * 6/1999 Ryan ........................... 702/45
5,975,160 A * 11/1999 Rush .......................... 141/192
6,041,965 A * 3/2000 Smith .......................... 222/25
6,047,250 A * 4/2000 Beaudoin et al. ........... 702/188
6,213,393 B1 * 4/2001 Streicher et al. ............ 235/381

FOREIGN PATENT DOCUMENTS

| | | |
|---|---|---|
| EP | 0 440 229 | 8/1991 |
| GB | 2 215 439 | 9/1989 |
| GB | 2 293 658 | 4/1996 |
| WO | WO 01/70624 | 9/2001 |

* cited by examiner

*Primary Examiner*—Kimberly D. Nguyen
(74) *Attorney, Agent, or Firm*—James B. Conte; Barnes & Thornburg, LLP

(57) ABSTRACT

A fluid delivery apparatus having a mobile storage container (10) having at least two compartments, for use in transporting at least two fluids from main storage tanks to subsidiary storage tanks (17, 18, 19). The apparatus having at least two fluid flow paths, for connection to at least two different fluid flow ports (20, 21, and 22) the apparatus includes electronic means (25) to identify the fluid flow paths and the fluid flow ports, to reduce the risk that a fluid flow path will be put into communication with an incompatible fluid flow port.

13 Claims, 6 Drawing Sheets

Double Probe Lead Arrangement

FLUID DELIVERY APPARATUS

BACKGROUND

The invention relates to fluid delivery apparatus.

Many different types of fluid delivery apparatus are known. One type consists of a tanker vehicle for use in transporting fluids, for example fuel oil, from a main storage tank to other storage tanks. Frequently one tanker vehicle has to carry a plurality of different fluids for delivery, for example, not only to domestic fuel tanks for use with central heating apparatus, but also to petrol stations for the storage of fuel for motor vehicles.

This requires separate storage compartments on the vehicle and also frequently requires apparatus defining separate delivery paths to avoid cross contamination between different fuels.

It is very important that the correct delivery path is used for the correct fuel, and furthermore, when connecting the tanker vehicle to a static storage tank, it is very important that the correct piece of apparatus on the tanker vehicle is connected to the matching apparatus on the storage tank.

Known devices for use in trying to reduce the risk that components are incorrectly coupled comprise mechanical keys, such as that disclosed in GB 2215439A. We have now devised a much more effective and versatile solution to the problem.

SUMMARY

The invention provides fluid delivery apparatus comprising a mobile storage container having at least two compartments, for use in transporting at least two fluids from main storage tanks to subsidiary storage tanks at other locations, the apparatus having means defining at least two fluid flow paths, for connection to at least two different fluid flow ports, the apparatus including electronic means to identify uniquely the fluid flow paths and the fluid flow ports, to reduce the risk that a fluid flow path will be put into communication with an incompatible fluid flow port.

The electronic means may comprise radio frequency tags arranged to provide a unique code when interrogated by a hand held control unit.

Alternatively, the electronic means may comprise bar codes arranged to be read by means of a hand held scanner.

The hand held control means may be arranged to provide an operator with an authorisation signal when the electronic means indicates that apparatus has been correctly coupled.

Alternatively, an authorisation signal may be used automatically to commence flow of fluid through the apparatus.

Specific embodiments of the invention will now be described, with reference to the accompanying drawings, in which:

DETAILED DESCRIPTION

Figure 1:
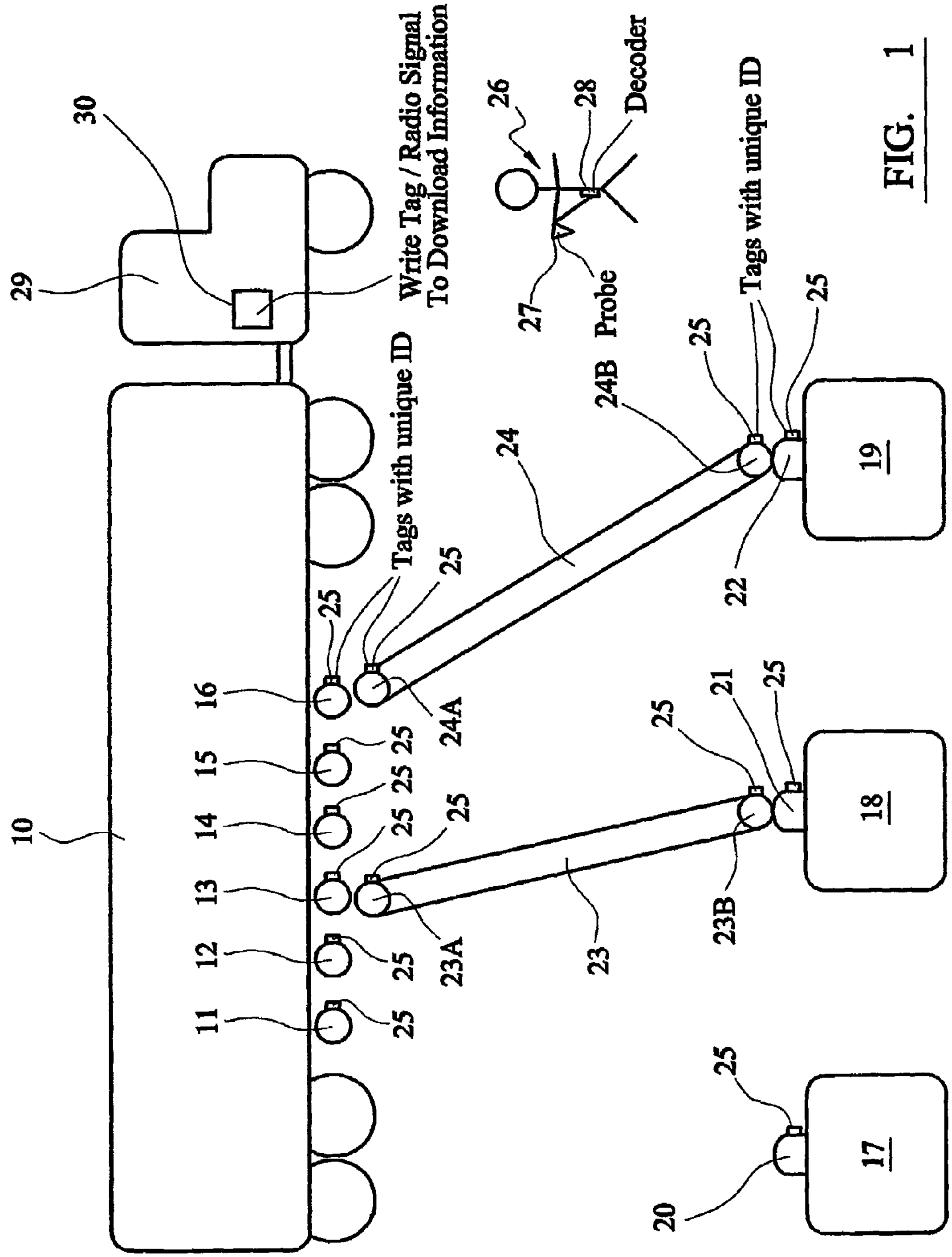
FIG. 1 is a diagrammatic illustration of a first embodiment of invention according to the invention illustrating a tanker vehicle and three static tanks.

The apparatus shown in FIG. 1 comprises a tanker vehicle 10 within which there are storage compartments for six different liquids, for example fuel oils of various sorts. Each compartment has its own fluid flow port 11 to 16, through which fluid can be loaded into the appropriate compartment and removed therefrom.

The compartments are filled at main storage depots and the vehicle then transports the fluids to subsidiary fluid tanks, for example domestic fuel tanks for containing central heating oil and petrol station tanks for delivery to motor vehicles.

Three such subsidiary tanks 17, 18 and 19 are shown in FIG. 1, although it will be appreciated that in practice these tanks may be positioned at different, spaced apart locations.

The vehicle 10 is provided with delivery hoses for connecting the ports 11 to 16 with ports 20, 21 and 22 associated with the subsidiary tanks 17, 18 and 19. Two such hoses are shown at 23 and 24 and each hose has its own fluid delivery ports 23*a*, 23*b*, 24*a*, 24*b*.

The valve and other arrangements for coupling the various components together, so that fluid can flow from the main storage tanks to the vehicle, and subsequently flow from the vehicle to subsidiary storage tanks, are conventional. However each port is fitted with a unique identification tag 25.

In the embodiment shown in FIG. 1, the tags comprise radio frequency tags (hereinafter referred to as RF tags). An operator, usually the tanker driver 26 is provided with a hand held controller comprising a probe 27 and a decoder 28.

The vehicle cab 29 is provided with information storage means 30.

Figure 2:
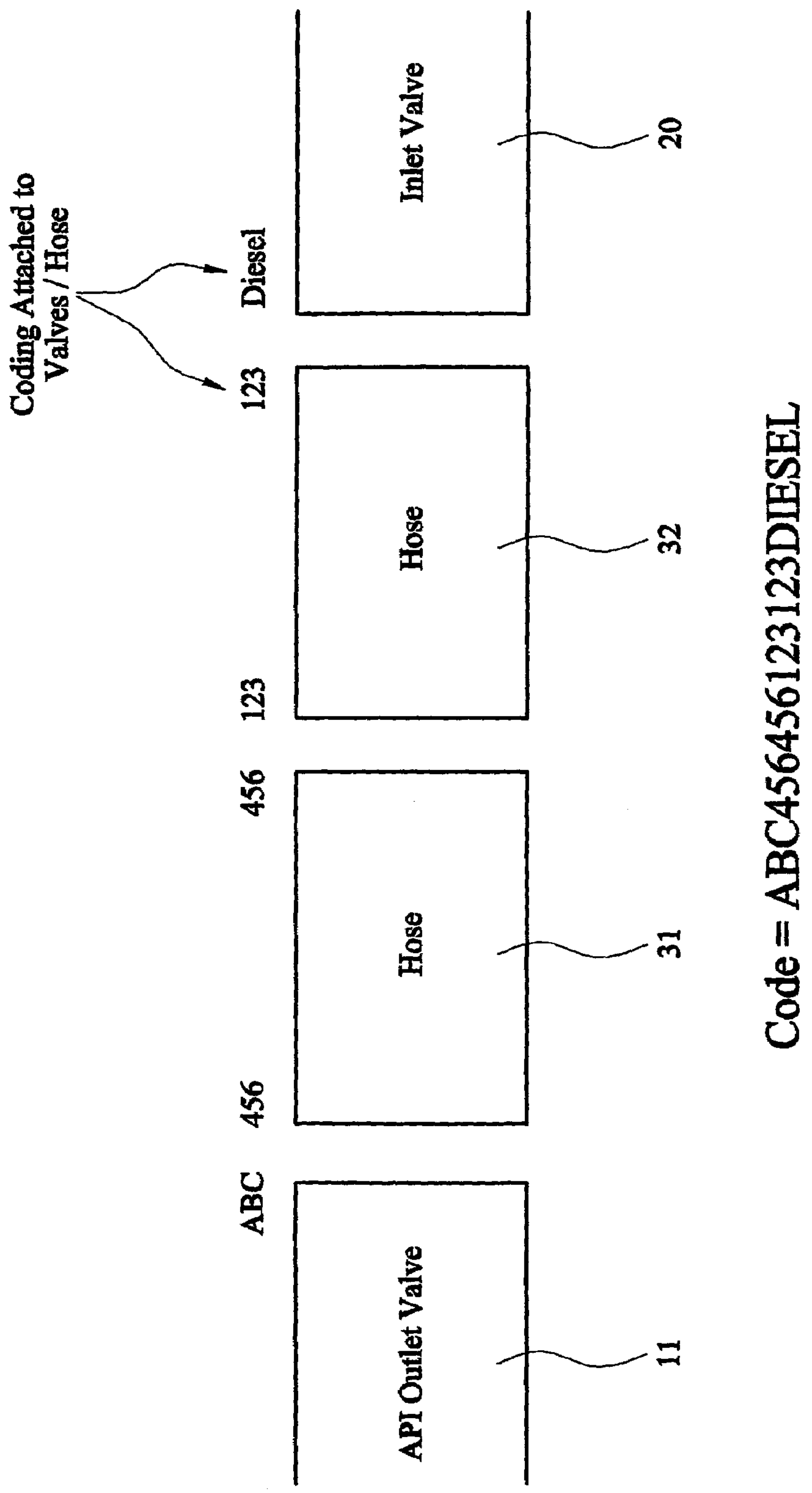
FIG. 2 illustrates fluid flow paths and fluid flow ports of the apparatus, with associated coding.

FIG. 2 illustrates one of the truck ports 11 which is to be connected to the inlet port 20 of storage tank 17. There is also shown a section of hose 31 carried by the vehicle and the section of hose 32 associated with the subsidiary tank location.

The vehicle compartment associated with port 11 contains diesel fuel and it is important, to avoid contamination, for this diesel fuel to be delivered through the correct hoses to the correct port 20.

The tag 25 of the port 11 comprises a radio frequency tag which, when interrogated by the probe 27, exhibits a code ABC say. Each end of the hose 31 exhibits a code 456. Each end of the hose 32 exhibits a code 123. The port 20 exhibits a code reading DIESEL.

Thus, if all the components are correctly coupled, a code will be generated reading ABC 456 456 123 123 DIESEL.

In a basic version of the invention, the hand held controller will provide the operator 26 with a signal confirming that the components have been correctly coupled, and he will then open the necessary valves.

Figure 3:
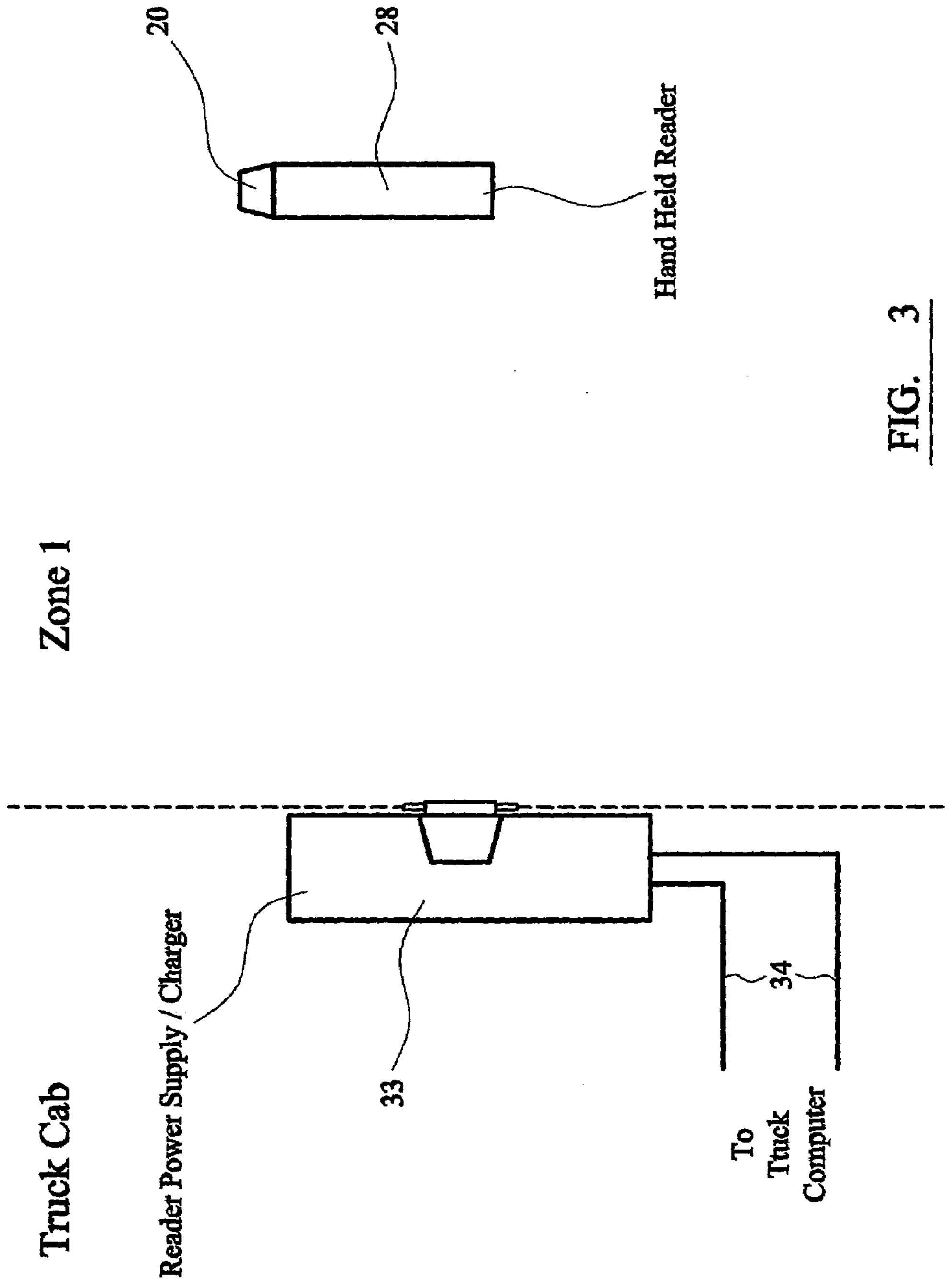
FIG. 3 illustrates identification components of the apparatus.

A more sophisticated version is also possible, in which a signal, for example from the hand held unit, will be passed to the information storage unit 30 in the cab 29, and this will automatically open the valves. FIG. 3 shows one example of this in which the unit 30 includes a reader 33 connected by wiring 34 to electrical controls for the valve. The reader can be actuated by placing the hand held unit 27, 28 adjacent to the truck cab.

Figure 4:
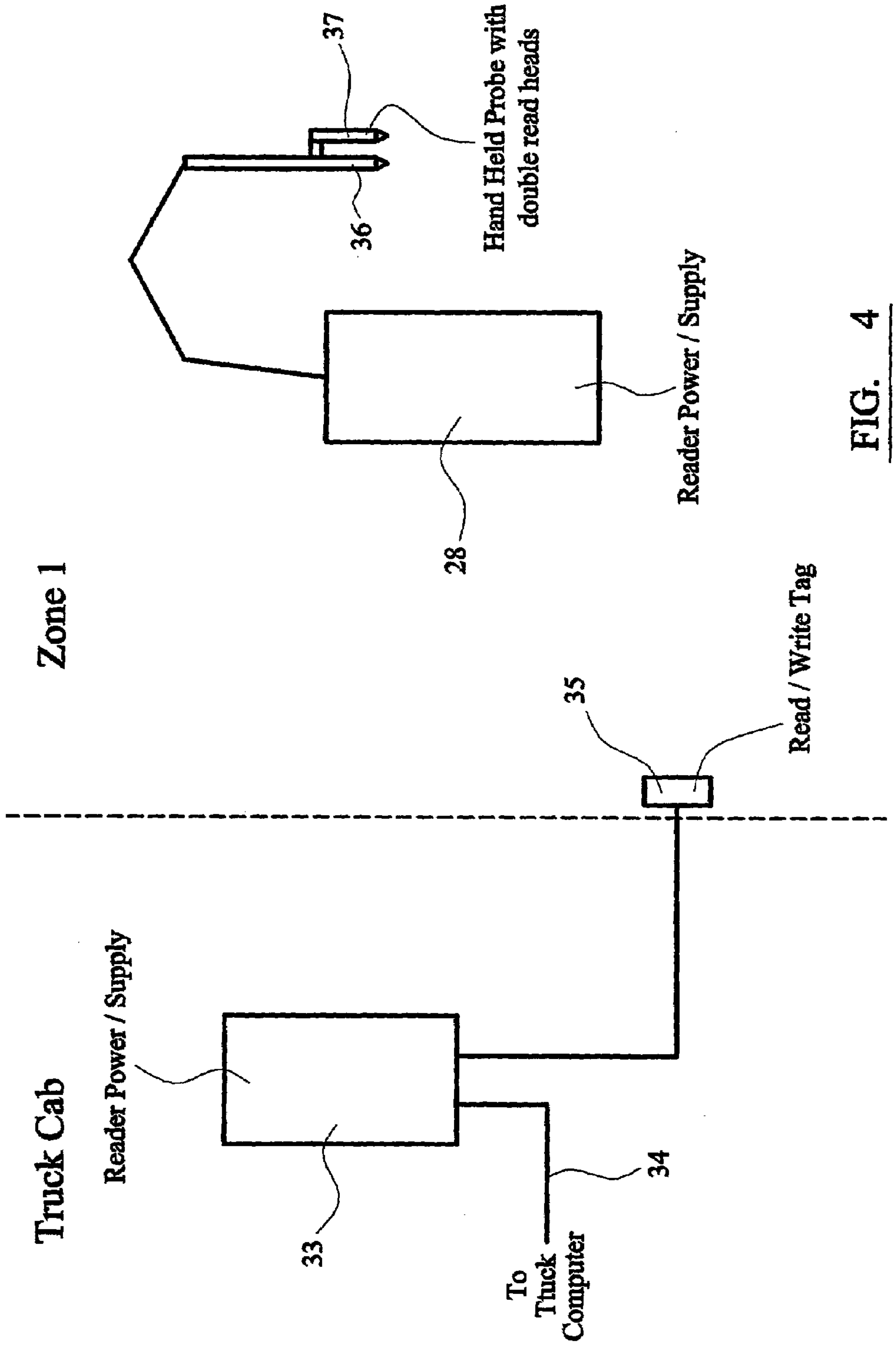
FIG. 4 illustrates alternative identification components.

FIG. 4 illustrates an arrangement in which the reader 33 has a separately located read/write tag 35 and the hand held reader has a decoder 28 with a probe having double read heads 36, 37.

Providing double read heads makes it possible to automatically read the codes of two adjacent components at the same time.

Figure 5:
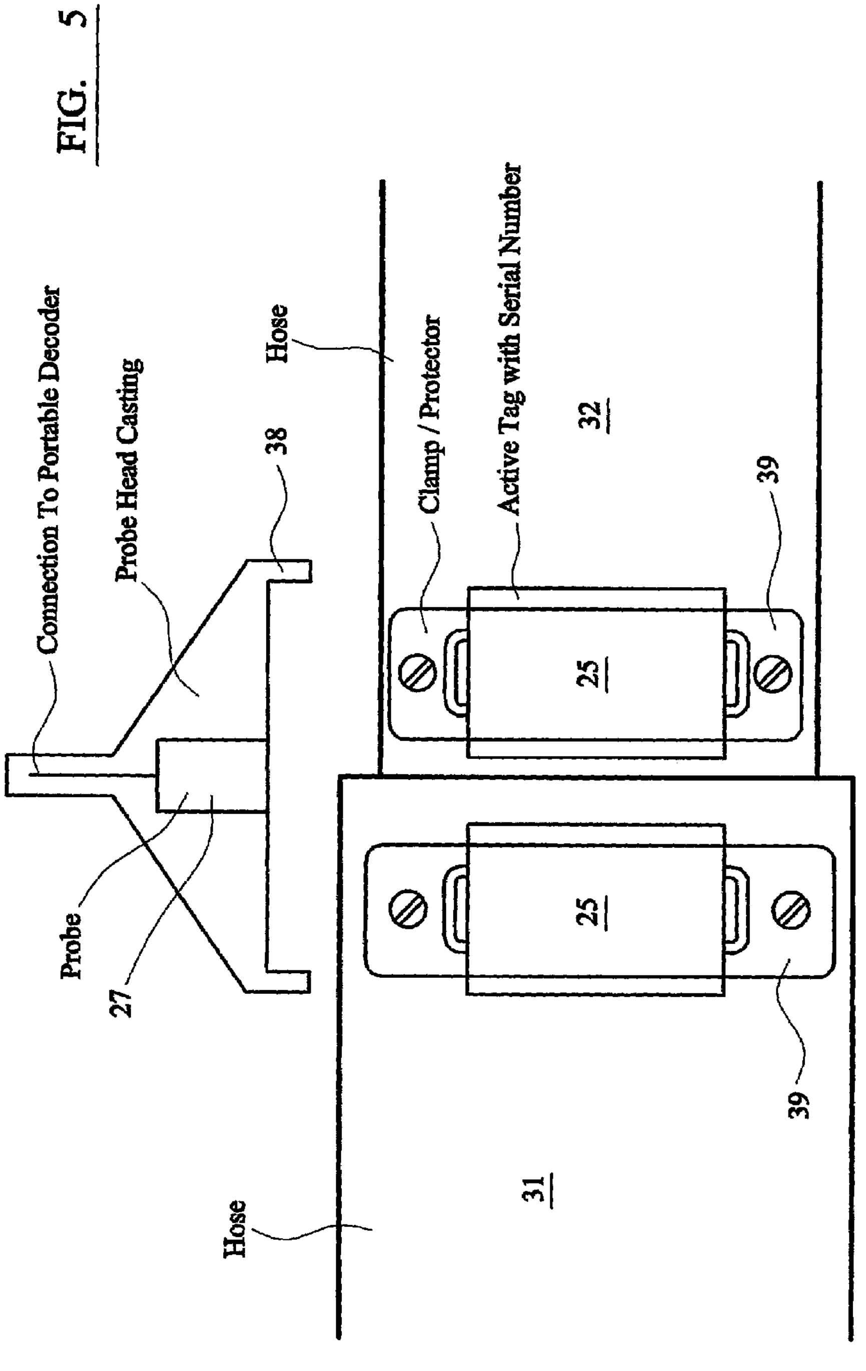
FIG. 5 illustrates yet further identification components of the apparatus.

FIG. 5 illustrates yet another arrangement in which the probe 27, in order to operate and read adjacent tags, has a head 38 which must fit over adjacent clamps 39 bearing the tags. This ensures that the hoses must have been connected.

A similar result could be achieved by ensuring that when a single probe is used to scan two tags which should be adjacent, the two codes must be read within a predetermined time interval. In other words a longer delay between the reading of two codes will be an indication that the two components have not been properly connected as they are not sufficiently closely adjacent, and so a positive signal to the operator or to the automatic apparatus will not be generated.

Figure 6:
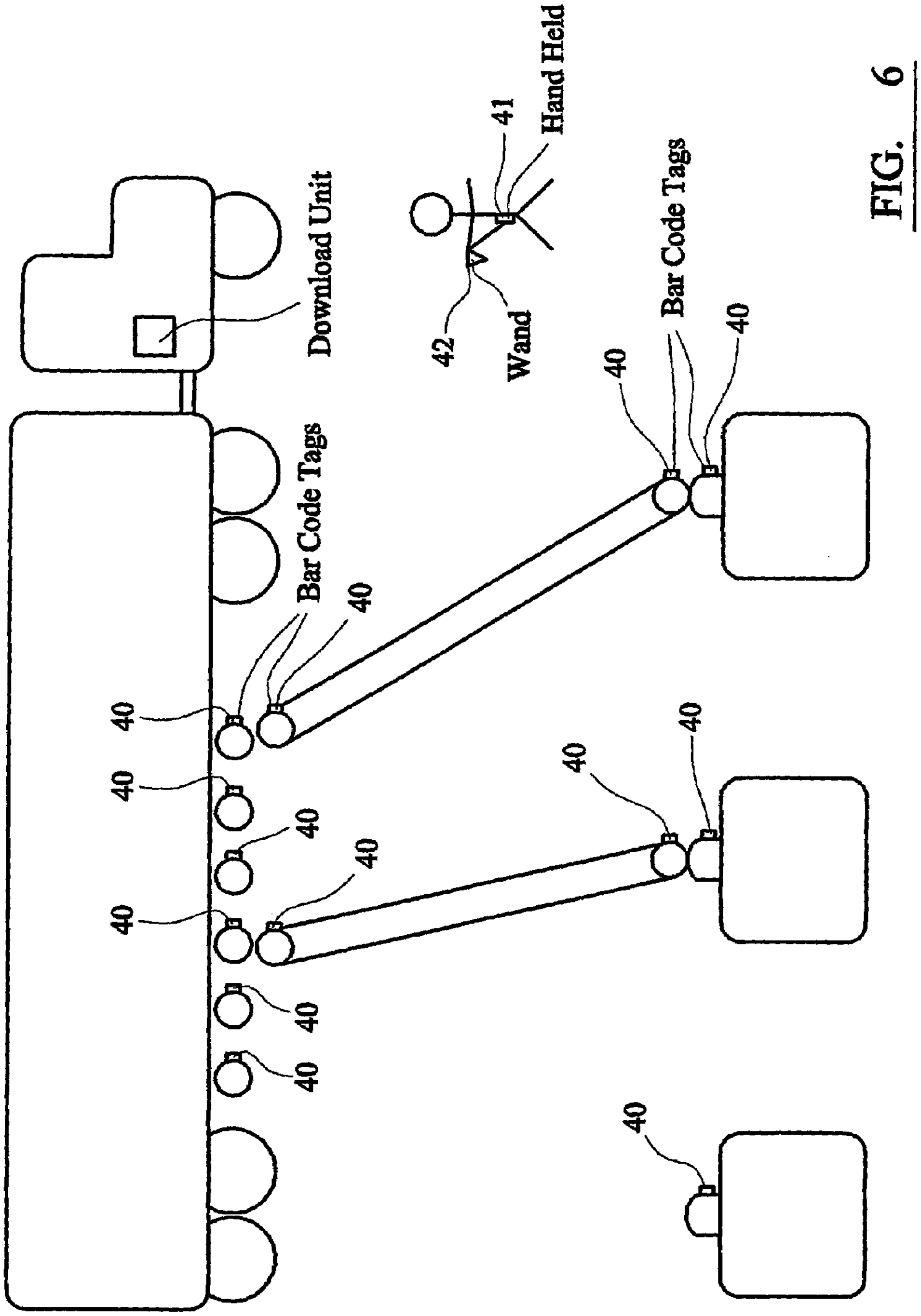
FIG. 6 illustrates an alternative embodiment of apparatus according to the invention.

Although the embodiment described above makes use of RF tags, other electronic arrangements are possible, such as that shown in FIG. 6, which utilises bar code tags 40 and a hand held apparatus 41 having a wand 42 for scanning the bar codes.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed In this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. Fluid delivery apparatus comprising a mobile storage container having at least two compartments, said mobile storage container for use in transporting at least two fluids from main storage tanks to subsidiary first and second storage tanks at other locations, at least first and second fluid flow ports, said first fluid flow port adapted to connect to a first fluid receiving opening, second fluid flow port adapted to connect to a second fluid receiving opening, said first port and second port upstream of said first and second subsidiary storage tanks, first and second electronically readable tags, each tag having readable information, said first tag's readable information identifying said first port, second tag's information identifying said second port, each tag's information readable by a control unit without having to hardwire a CPU to either of said tags, said first and second tags to reduce the risk that either of said ports will be put into communication with an incompatible one of said first or second subsidiary storage tanks.

2. Fluid delivery apparatus as claimed in claim 1, in which the electronically readable tags comprise radio frequency tags arranged to provide a unique code when interrogated by said control unit.

3. Fluid delivery apparatus as claimed in claim 2, in which the mobile storage container comprises a tanker vehicle.

4. Fluid delivery apparatus as claimed in claim 1, in which the readable tags comprise bar codes arranged to be read by said control unit.

5. Fluid delivery apparatus as claimed in claim 4, in which the mobile storage container comprises a tanker vehicle.

6. Fluid delivery apparatus as claimed in claim 1, in which said first fluid receiving opening is a first conduit port which opens into a first fluid conduit, said second fluid receiving opening is a second port conduit which opens into a second conduit, and wherein a third electronically readable tag has readable information identifying said first conduit port, a fourth electronically readable tag has readable information identifying said second conduit port, each third and fourth tag readable by said control unit without having to hard wire a CPU to either of said tags.

7. Fluid delivery apparatus as claimed in claim 6, in which the apparatus based on the electronic tags arragement relative to one another generates an authorization signal which is used to automatically commence flow of fluid through the apparatus.

8. Fluid delivery apparatus as claimed in claim 7, in which the mobile storage container comprises a tanker vehicle.

9. Fluid delivery apparatus as claimed in claim 6, in which the control unit, based on the electronically readable tags arrangement relative to one another, generates a signal.

10. Fluid delivery apparatus as claimed in claim 6, in which the mobile storage container comprises a tanker vehicle.

11. Fluid delivery apparatus as claimed in claim 1, in which the mobile storage container comprises a tanker vehicle.

12. Fluid delivery apparatus as claimed in claim 1, in which said first fluid receiving opening is a first subsidiary storage tank port, said second fluid receiving opening is a second subsidiary storage tank port and wherein a third electronically readable tag has readable information identifying said first subsidiary storage tank port, a fourth electronically readable tag has readable information identifying said second subsidiary storage tank port, each third and fourth electronically readable tags readable by said control unit without having to have a CPU hardwired to either of said tags.

13. Fluid delivery apparatus as claimed in claim 12, in which the control unit, based on the electronically readable tags arrangement with one another, generates a signal.

* * * * *